US008046742B1

(12) United States Patent
Bouchard et al.

(10) Patent No.: US 8,046,742 B1
(45) Date of Patent: Oct. 25, 2011

(54) SELF-ASSEMBLING SOFTWARE GENERATOR

(75) Inventors: Ann M. Bouchard, Albuquerque, NM (US); Gordon C. Osbourn, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1301 days.

(21) Appl. No.: 11/670,448

(22) Filed: Feb. 2, 2007

(51) Int. Cl.
*G06F 9/44* (2006.01)

(52) U.S. Cl. ........ 717/124; 717/106; 717/107; 717/117; 717/162

(58) Field of Classification Search .......................... None
See application file for complete search history.

(56) References Cited

U.S. PATENT DOCUMENTS

| | | | | |
|---|---|---|---|---|
| 4,796,179 | A * | 1/1989 | Lehman et al. ................. | 700/86 |
| 6,637,019 | B1 * | 10/2003 | Rinaldi ......................... | 717/104 |
| 6,876,314 | B1 * | 4/2005 | Lin ................................. | 341/50 |
| 6,898,788 | B2 * | 5/2005 | Kosaka et al. ................ | 717/162 |
| 6,957,415 | B1 | 10/2005 | Bouchard et al. | |
| 6,973,639 | B2 * | 12/2005 | Hashimoto et al. ........... | 717/106 |
| 6,986,125 | B2 * | 1/2006 | Apuzzo et al. ................ | 717/124 |
| 7,730,459 | B2 * | 6/2010 | Gates et al. ................... | 717/131 |
| 7,757,206 | B2 * | 7/2010 | Doggen ........................ | 717/106 |
| 7,886,269 | B2 * | 2/2011 | Williams et al. .............. | 717/121 |
| 2002/0032901 | A1 * | 3/2002 | Chessin ......................... | 717/10 |
| 2003/0005171 | A1 * | 1/2003 | Schaeffer ...................... | 709/315 |
| 2003/0140028 | A1 * | 7/2003 | Sjogren et al. .................. | 707/1 |
| 2003/0208743 | A1 * | 11/2003 | Chong et al. ................. | 717/106 |
| 2004/0230945 | A1 * | 11/2004 | Bryant et al. ................. | 717/106 |
| 2005/0188355 | A1 * | 8/2005 | McCarthy ..................... | 717/117 |
| 2005/0268278 | A1 * | 12/2005 | Doggen ........................ | 717/107 |

OTHER PUBLICATIONS

Author: Yasuhiro Sugiyama, Title: Object Make: A Tool for Constructing Software System from Existing Software Components, Date 1995, Publisher: ACM, pp. 128-136 (9).*
Author: Don Batory and Sean O'Malley, Title: The Design and Implementation of Hierarchical Software System With Reusable Components, Date: Oct. 1992, Publisher: ACM, pp. 1-47 (47).*
Charles Zhang et al, "Towards Justintime Middleware Architectures", [online] 2002, pp. 63-74, [Retrieved on Aug. 4, 2011], Retrieved from Internet: <URL:http://delivery.acm.org/10.1145/1060000/1052904/p63-zhang.pdf>.*
Robert Farrell et al, "Dynamic Assembly of Learning Objects" [online], May 2004, pp. 163-169, [Retrieved on Aug. 4, 2011], Retrieved from Internet: <URL: http://delivery.acm.org/10.1145/1020000/1013394/p162-farrell.pdf>.*
Jin Dong et al., "IBM Smartscor—a Scor Based Supply Chain Transformation Platform Through Simulation and Optimization Techniques", [online], Dec. 2006, pp. 650-659, [Retrieved on Aug. 4, 2011], Retrieved from Internet: <URL: http://delivery.acm.org/10.1145/1220000/1218234/p650-dong.pdf>.*
James A. Whittaker, "What Is Software Testing? And Why Is It So Hard?", [online], 2000, pp. 70-79, [Retrieved on Aug. 4, 2011] Retrieved from Internet: <URL:http://citeseerx.ist.psu.edu/viewdoc/download?doi=10.1.1.110.2513&rep=rep1&type=pdf>.*

(Continued)

*Primary Examiner* — Thuy Dao
*Assistant Examiner* — Ziaul A Chowdhury
(74) *Attorney, Agent, or Firm* — Blakely Sokoloff Taylor & Zafman; Kevin W. Bleg (57) ABSTRACT

A technique to generate an executable task includes inspecting a task specification data structure to determine what software entities are to be generated to create the executable task, inspecting the task specification data structure to determine how the software entities will be linked after generating the software entities, inspecting the task specification data structure to determine logic to be executed by the software entities, and generating the software entities to create the executable task.

27 Claims, 10 Drawing Sheets

OTHER PUBLICATIONS

Osbourn, Gordon C. et al., "Dynamic Self-Assembly of Hierarchical Software Structures/Systems", Sandia National Laboratories, Mar. 2003.

Bouchard, Ann M. et al., "Dynamic Self-Assembly and Computation: From Biological to Information Systems", Sandia National Laboratories, Physical and Chemical Sciences Center, Jan. 2004.

U.S. Appl. No. 10/456,115, filed Jun. 5, 2003.
U.S. Appl. No. 11/527,002, filed Sep. 26, 2006.
U.S. Appl. No. 11/527,100, filed Sep. 26, 2006.

* cited by examiner

SELF-ASSEMBLING SOFTWARE GENERATOR

This invention was made with Government support under Contract No. DE-AC04-94AL85000 between Sandia Corporation and the U.S. Department of Energy. The U.S. Government has certain rights in this invention.

TECHNICAL FIELD

This disclosure relates generally to software, and in particular but not exclusively, relates to a code generator for generating executable code.

BACKGROUND INFORMATION

A conventional code generator is a software tool that automatically writes source code and provides an alternative to manual coding that can be faster and less prone to typographical errors or other human errors. These code generators can improve productivity by automatically generating source code that otherwise would need to be manually written by a human.

However, conventional code generators are designed for software designers and engineers with extensive knowledge of software programming. Inputs into these software tools are often Unified Modeling Language ("UML") diagrams, flow charts, source code templates, or other vehicles software designers or engineers use to specify software design. These design diagrams and source codes specify the structure of the classes, data, methods, etc. of the software to be generated, and how these elements interact. Accordingly, software designers or engineers must have already determined the design of the code before taking advantage of the code generator's capability to translate the design into source code.

These conventional code generators generate source in a target language, such as Java, C++, or C#, which must then be compiled. Typically, the generated source code is one small piece of a larger application, consisting of many other source code files that had to be hand-written by programmers. Some code generators can generate code and just-in-time compile it at run-time. But even in these cases, the input is typically designed and/or written by a software engineer.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for generating executable code using a code generator are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
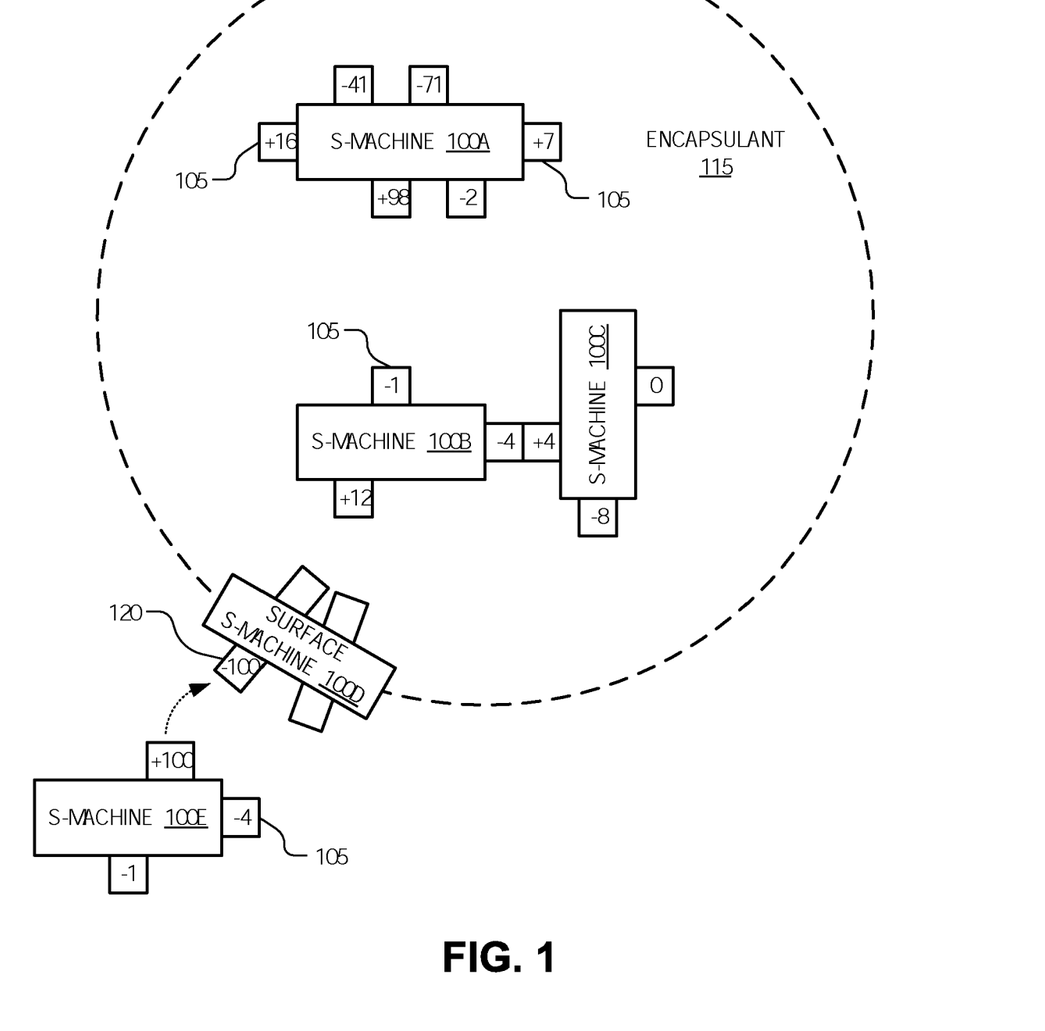
FIG. 1 is a block diagram illustrating self-assembling s-machines grouped in an encapsulated environment, in accordance with an embodiment of the invention.

FIG. 1 is a block diagram illustrating a software virtual environment including software entities termed "software-machines" or "s-machines" 100A-100E (collectively s-machines 100), in accordance with an embodiment of the invention. Each s-machine 100 is capable of executing a function, which can be simple (such as adding two numbers) or complex (such as reading a complex formatted file from the hard disk). Each s-machine 100 includes one or more of a data storage element to store data, an actuating element to execute commands, or a control element to control activation of the s-machine in response to a stimulus.

S-machines 100 are capable of self-assembling or self-organizing by binding or linking to each other to form a larger s-machine complex capable of executing higher level complex tasks. For example, multiple s-machines 100 may be created, one capable of summing two operands, one capable of subtracting one operand from another, one capable of multiplying two operands, and yet another capable of dividing one operand into another operand. The s-machines capable of implementing these simple mathematical functions may then bind together with one or more other s-machines capable of generating a graphical user interface ("GUI"). By self-organizing into a more complex structure, these simple s-machines can create a graphical calculator. Since self-organizing is executed during runtime, additional s-machines capable of other mathematical functions can be created and joined with the existing s-machines of the calculator group to extend the functionality of the calculator during runtime, after compile time. In this manner, s-machines 100 are capable of generating a real-time, user-adaptable, computing environment.

S-machines 100 self-assemble using binding sites 105 (only a portion are labeled so as not to clutter the drawing). Each s-machine 100 may include one or more binding sites 105 that can remain concealed pending the occurrence of prerequisite conditions, at which time the concealed binding site exposes itself to other s-machines 100. In some cases, the act of binding itself is the prerequisite or stimulus for exposing another concealed binding site. Each binding site 105 is associated with a key and can stochastically or deterministically bind to another exposed binding site on a different s-machine 100 having a complementary key. S-machines 100 make and break bonds formed between complementary binding sites 105 in due course during runtime. In one embodiment, when binding sites of two s-machines 100 are linked, the two sites have pointers pointing to each other. This provides a data pathway between the two s-machines, enabling the s-machines to access each other's data, pass data to each other, or send commands to each other. These bonds may be short-lived or long-lived. The act of binding/unbinding (also referred to linking/unlinking or coupling/decoupling) may be the stimulus to cause one or more internal actuation elements of an s-machine 100 to execute. A signal (whether data-passing or not) sent from one s-machine to a bound s-machine may also be the stimulus to cause internal actuation elements of one or both s-machines 100 to execute. In other cases, other stimulus may cause an s-machine 100 to execute its actuation element(s).

S-machines 100 can self-organize into hierarchical data structures having limited scope. For example, surface s-machine 100D may function as an interface to encapsulant 115 to limit the scope of s-machines 100A-100C contained within encapsulant 115. Encapsulant 115 acts as a sort of virtual environment of limited scope where s-machines 100 within this virtual environment form some application, function, or process.

Surface s-machine 100D can operate as a sort of gate keeper allowing s-machines to enter or exit encapsulant 115. In this role, surface s-machine 100D has a key associated with a binding site 120 and any s-machine 100 wishing to pass through the virtual encapsulant surface must have a complementary key. Alternatively, surface s-machine 100D can operate as a signal transducer across the encapsulant surface. In that role, when an external s-machine having a complementary key binds to binding site 120, this stimulates surface s-machine 100D to expose a site internal to the encapsulant, which can trigger the execution of some internal task by binding to a control site of an internal s-machine. Encapsulant 115 effectively creates a local environment in which collections of free binding sites 105 can interact without interference from the outside world. S-machines 100 encapsulated within encapsulant 115 can reuse binding keys already in use by other s-machines outside of encapsulant 115 without establishing bonds thereto. It should be appreciated that encapsulant 115 is not necessarily intended to connote a literal barrier formed around the internal s-machines 100A, 100B, 100C, but rather a functional barrier that computationally isolates the internal s-machines 100A, 100B, and 100C in some manner from external s-machine 100E.

In one embodiment, the virtual environment created by s-machines 100 and encapsulant 115 is a biologically inspired software architecture. S-machines 100 are analogous to proteins, which operate as molecular machines. S-machines 100 self-assemble via binding/unbinding events in a dynamic manner similar to continually reconfiguring proteins. As mentioned, the bonds between s-machines 100 can be long lived, analogous to strong covalent bonds, or fleeting, analogous to weak protein-protein bonds. Encapsulant 115 resembles a biological cell membrane that isolates its internal contents from bonding interactions with external structures. Surface s-machine 100D, itself, is analogous to membrane proteins in biological cells. Some surface s-machines, termed "gates", correspond to channel proteins, allowing passage of other entities (s-machines or encapsulants) into or out of the encapsulant. Other surface s-machines may correspond to signal or receptor proteins capable of communicating signals without transporting any s-machines into or out of an encapsulant.

Figure 2A:
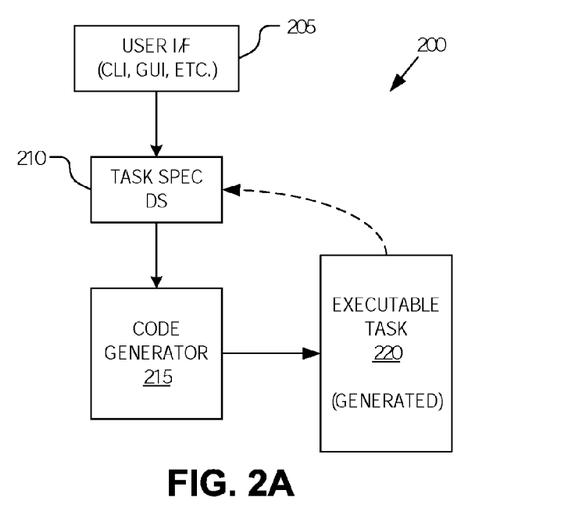
FIG. 2A is a functional block diagram illustrating an architecture for generating an executable task using a code generator of self-assembling software, in accordance with an embodiment of the invention.

FIG. 2A is a functional block diagram illustrating an architecture 200 for generating an executable task using a code generator of self-assembling software machines, in accordance with an embodiment of the invention. The illustrated embodiment of architecture 200 includes a user interface 205, a task specification data structure ("task spec DS") 210, a code generator 215, and an executable task 220.

Figure 3:
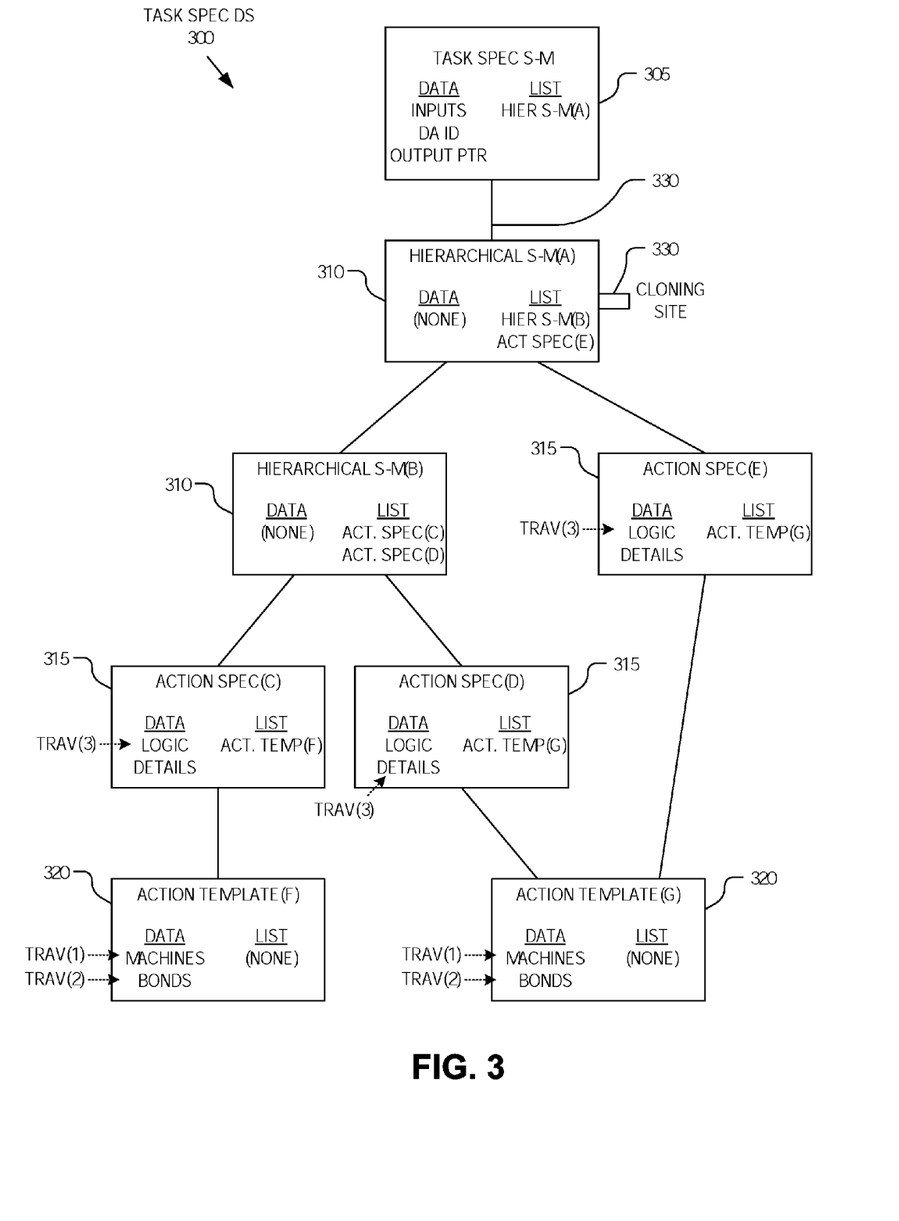
FIG. 3 is an architectural block diagram illustrating a task specification data structure, in accordance with an embodiment of the invention.

During operation, code generator 215 inspects task spec DS 210 and generates the various software entities or s-machines that make up executable task 220. Task spec DS 210 is a sort of task specification that contains information necessary to create executable task 220. In one embodiment, it may be considered a user defined specification of functionality. Task spec DS 210 may contain information for determining what s-machines are needed to create executable task 220, information for determining the particular logic to be implemented by and included within the s-machines making up executable task 220, and information for determining the ordered links or bonds between the constituent s-machines to guide self-organization of the s-machines. In one embodiment, task spec DS 210 is implemented as a hierarchical data structure, as illustrated in FIG. 3, and discussed in detail below. Task spec DS 210 may be generated via user interface 205 (e.g., a command line interface ("CLI"), a graphical user interface ("GUI"), a combination of CLI and GUI, etc.) and/or it may be provided to a user within a library of pre-created task spec DS's.

Executable task 220 may represent a collection of one or more s-machines generated and linked together to perform one or more related functions, referred to as a "task". For example, executable task 220 may represent a calculator task including s-machines to perform addition, subtraction, multiplication, division, and various other mathematical functions, as well as, s-machines to implement a GUI for the calculator task. Other executable tasks tailored to implement other functions may be generated using code generator 215 with reference to other task spec DS's. Executable task 220 generated by code generator 215 may be generated directly in random access memory ("RAM") of the processing system executing code generator 215. Executable task 220 is ready for execution after generation by code generator 215 without additional compiling. In other words, in one embodiment, executable task 220 and its constituent s-machines generated by code generator 215 are executables—not source code. In other embodiments, code generator 215 may first generate source code, which is then automatically compiled into executable entities.

Once generated, task spec DS 210 may break off from code generator 215, freeing code generator 215 to bind to other task spec DS's to generate other executable tasks. In one embodiment, once executable task 220 and task spec DS 210 unbind from code generator 215, they bind together to run executable task 220.

Figure 2B:
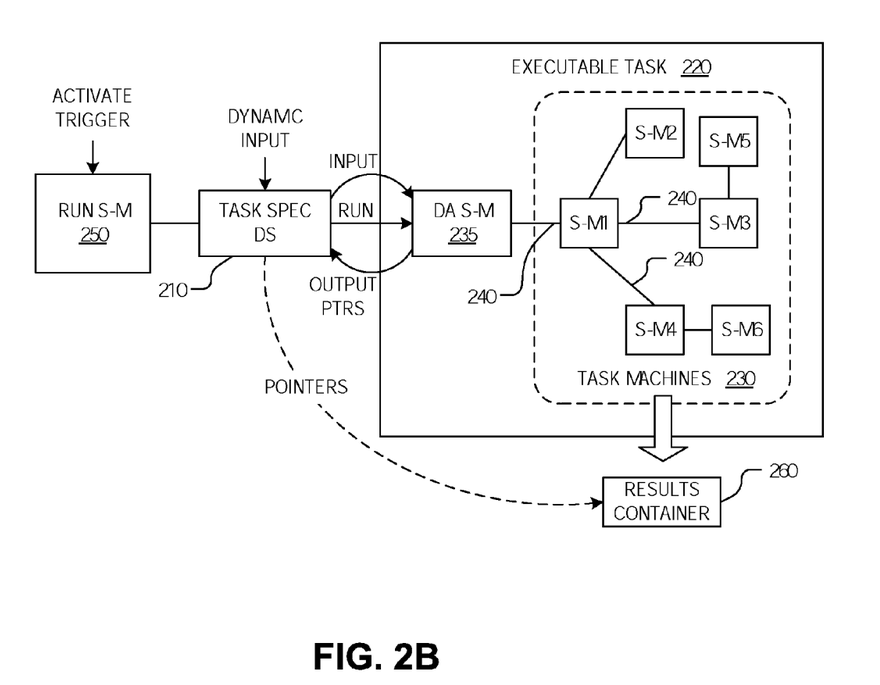
FIG. 2B is a functional block diagram illustrating execution of a generated executable task, in accordance with an embodiment of the invention.

FIG. 2B is a functional block diagram illustrating operation of executable task 220 once it has coupled to task spec DS 210, in accordance with an embodiment of the invention. The illustrated embodiment of executable task 220 includes generated software entities or s-machines S-M1, S-M2 . . . , S-M6, collectively referred to as task s-machines 230 and a task data access ("DA") s-machine 235. Although executable task 220 is illustrated as including six task s-machines 230, it should be appreciated that executable task 220 may include any number of task s-machines 230.

Upon generation, task s-machines 230 and task DA s-machine 235 self-assemble or self-organize, as illustrated by links 240 (only a portion are labeled), to form executable task 220. Task DA s-machine 235 operates as the access point to executable task 220 while task s-machines 230 operate to implement the functionality of executable task 220. As illustrated, in one embodiment, task spec DS 210 links to task DA s-machine 235 and a run s-machine 250 links to task spec DS 210.

In the illustrated embodiment, task spec DS 210 retrieves dynamic input, such as, input pertinent to the instant execution of executable task 220 and which may change from one execution of executable task 220 to the next. For example, if executable task 220 is an accounting routine to be executed on a spreadsheet of data, then the dynamic input may include an identification of which spreadsheet executable task 220 will take as an input. Accordingly, executable task 220 may be rerun on multiple different spreadsheets simply by changing the dynamic input. Task spec DS 210 provides input data to executable task 220 via task DA s-machine 235 as well as a run signal indicating to executable task 220 to commence execution. Upon completion, executable task 220 stores results of the execution to a results container 260 and outputs a pointer to task spec DS 210 indicating the location of the results. Although results container 260 is illustrated as external to executable task 220, results container 260 may be internal or external to executable task 220. For example, results container 260 may be a file stored in persistent memory (e.g., hard disk) or may be one of task s-machines 230 assigned the task of storing execution results. Moreover, there could be more than one results container associated with executable task 220, if there are intermediate or multiple results generated by executable task 220. In this case, pointers to all results are output to task spec DS 210.

FIG. 3 is an architectural block diagram illustrating a task spec DS 300, in accordance with an embodiment of the invention. Task spec DS 300 represents one example implementation of task spec DS 210. The illustrated embodiment of task spec DS 300 is a hierarchical data structure including a task specification s-machine 305, hierarchical s-machines 310 (e.g., hierarchical S-M(A) and hierarchical S-M(B)), action specification s-machines 315 (e.g., action spec S-M(C), action spec S-M(D), and action spec S-M(E)), and action template s-machines 320 (e.g., action template (F) and action template (G)). Although FIG. 3 illustrates task spec DS 300 as including two hierarchical s-machines 310, three action specification s-machines 315, and two action template s-machines 320, it should be appreciated that task spec DS 300 may include any number of each of these software entities.

In the illustrated embodiment, task specification s-machine 305 is the top s-machine of the hierarchical data structure forming task spec DS 300. Task specification s-machine 305 links to code generator 215 to generate executable tasks (e.g., executable task 220). The list information stored by task specification s-machine 305 includes an ordered list of the s-machines coupled directly below task specification s-machine 305. The ordered list may be used by code generator 215 during generation of executable task 220 to navigate or traverse task spec DS 300 in an ordered manner.

Hierarchical s-machines 310 include list information for organizing task spec DS 300, connoting execution order, and providing navigational information to code generator 215.

Action template s-machines 320 include data for identifying specific task s-machines 230 (e.g., S-M1 to S-M6) that will be generated to form executable task 220 along with linking/binding data for determining the organizational structure into which task s-machines 230 will self-assemble to form links 240. Action template s-machines 320 may provide details for how default s-machines may be modified to implement specific sub-tasks. For example, action template s-machines 320 may identify default s-machines having a minimum set of binding sites 105 and then provide modification details for adding specialized binding sites 105 specifically tailored for the sub-task. Alternatively, action template s-machines 320 may identify default s-machines having a full set of binding sites 105 and then provide modification details for pruning unused binding sites 105. Of course, action template s-machines 320 may also define some intermediate combination of the minimum or maximum set of binding sites 105 along with modification details to prune or add binding sites 105 from these default s-machines as desired.

The illustrated embodiments of action specification s-machines 315 link below a respective one of hierarchical s-machines 310 and include the logic details associated with the various functions to be implemented by executable task 220. The list information included within action specification s-machines 315 identify action templates 320 linked below. The logic details may be used to add to, remove, or modify default logic associated with action template s-machines 320 to thereby customize the functionality of default s-machines defined by action template s-machines 320.

During code generation, code generator 215 passes the task specification s-machine 305 a data access identifier ("DA ID") for identifying the task DA s-machine 235 that is the entry point into the executable task 220 that was generated. After code generation, task specification s-machine 305 unlinks from the code generator 215 and subsequently uses the DA ID to identify and link to the generated executable task 220. Task specification s-machine 305 may store data including dynamic inputs retrieved prior to execution of executable task 220. Executable task 220 uses the inputs provided by task specification s-machine 305, executes, and passes output data and/or links (e.g., pointers) to where the output data have been stored to task specification s-machine 305.

The top level hierarchical s-machine 310 (e.g., hierarchical s-machine(A) 310) may include a cloning site 330 for linking to other task specification s-machines 305. For example, each time the top level hierarchical s-machine 310 links to a new task specification s-machine 305, it generates a new cloning site 330. From a functional perspective, cloning site 330 may be no different than link 333 between hierarchical s-machine 310 and task specification s-machine 305. Via cloning sites 330, multiple task specification s-machines 305 may link to the lower hierarchy of task spec DS 300. Each one of the multiple task specification s-machines 305 could link to the executable task 220 and would typically provide different inputs to executable task 220. Different results from each of the executions would then be passed as outputs to the respective task specification s-machines 305.

Task spec DS 300 may be used to generate a variety of different executable tasks. By way of example, not limitation, task spec DS 300 may define an executable task for reading in an image file and running one or more filters on the image file to sharpen and automatically correct color balance for the image. In this image filter example, action template (F) s-machine 320 may define the s-machines and bonds between those s-machines for reading in an image file while action template (G) s-machine 320 may define the s-machines and bonds between those s-machines for running filter(s) on an image. Action specification (C) s-machine 315 may include information for reading images of a particular format, while action specification (D) s-machine 315 may include information for running the filter that sharpens edges of an image. Hierarchical s-machine (B) 310 may include a subroutine that first invokes an image read on a file and then invokes an image sharpen on the file. Action specification (E) s-machine 315 may include information for running color balance enhancements (e.g., hue and/or saturation adjustments) on an image file. Hierarchical s-machine (A) 310 may include another subroutine that first calls the subroutine within hierarchical s-machine (B) 310 and then calls action specification (E) s-machine 315 to perform color balance enhancements. Finally, in this example, task spec s-machine 305 may include information such as which image file is to be accessed and modified by an executable task generated based on task spec DS 300 and where the modified image file is to be located.

Figure 4:
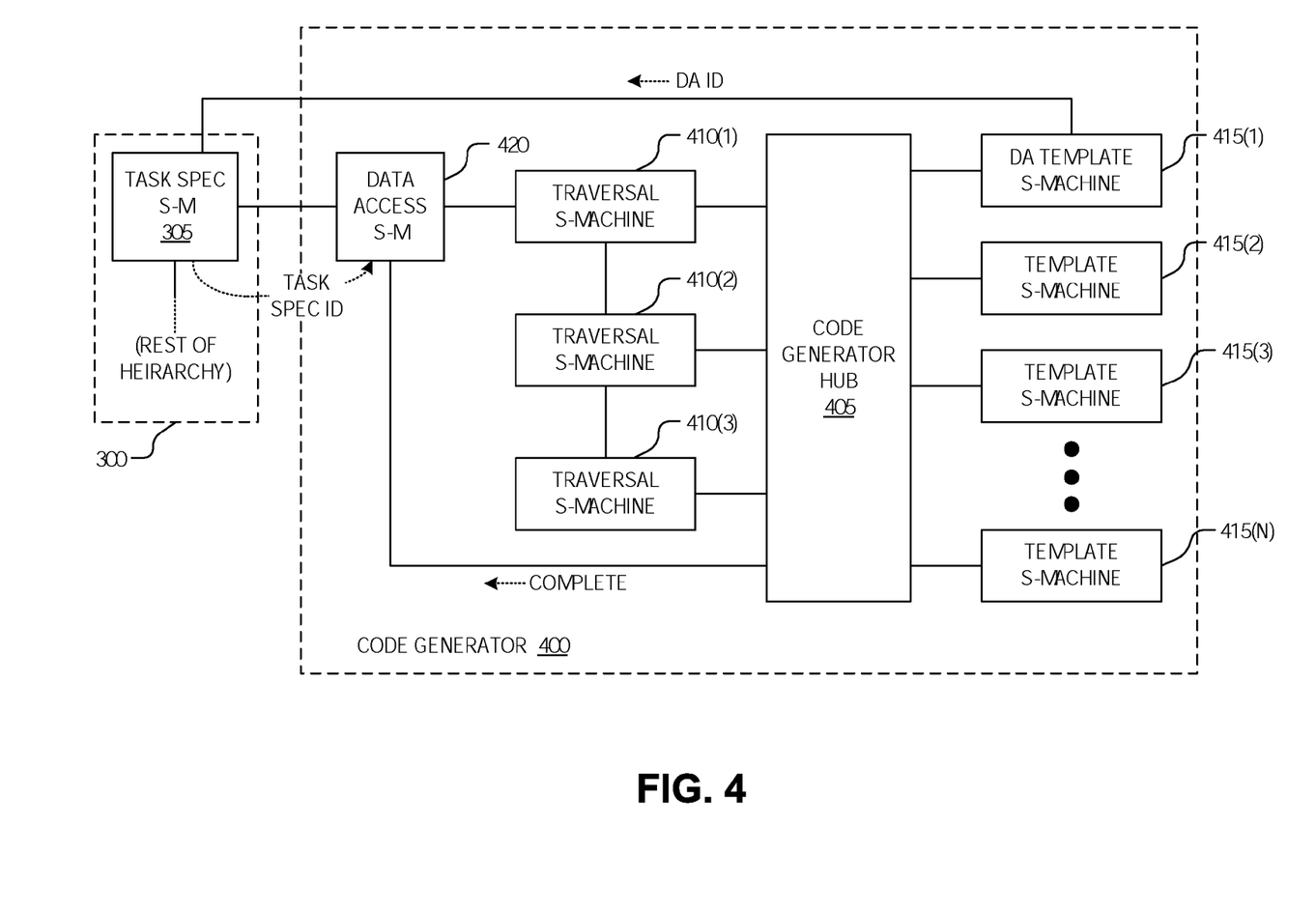
FIG. 4 is a functional block diagram illustrating components of a code generator for generating executable tasks using self-assembling software, in accordance with an embodiment of the invention.

FIG. 4 is a functional block diagram illustrating components of a code generator 400 for generating executable tasks using self-assembling software, in accordance with an embodiment of the invention. The illustrated embodiment of code generator 400 represents one possible implementation of code generator 215 illustrated in FIG. 2A. The illustrated embodiment of code generator 400 includes a code generator hub 405, traversal s-machines 410(1), 410(2), and 410(3) (collectively traversal s-machines 410), template s-machines 415(1) to 415(N) (collectively template s-machines 415), and a code-gen DA s-machine 420.

The subcomponents of code generator 400 are interlinked as follows. Code generator hub 405 operates as a central communication hub for code generator 400 by linking to traversal s-machines 410 and template s-machines 415 to provide interlinking communication pathways and data processing. Code-gen DA s-machine 420 operates as the linking point for task spec DS 300 and provides the main communication pathway to code generator hub 405 via traversal s-machine 410(1). Code-gen DA s-machine 420 may further link directly to code generator hub 405 to receive status signals, such as a generation-complete signal. As illustrated, task spec DS 300 links to code generator 400 by forming a link between task specification s-machine 305 and code-gen DA s-machine 420.

Traversal s-machines 410 are designed to traverse the task spec DS 300, seeking data of a particular type, then pass this data to code generator hub 405 for processing. Traversal s-machines 410 act as communication links between task spec DS 300 and code generator hub 405. Traversal s-machine 410(1) inspects tasks spec DS 300 seeking out s-machine type data located in action templates 320, describing which types of s-machines need to be created to generate executable task 220. Traversal s-machine 410(2) inspects task spec DS 300 for key pair data to generate links 240 (key pair data are also located in action templates 320). Traversal s-machine 410(3) inspects task spec DS 300 looking for logic details located in action specification s-machines 315.

When code generator hub 405 receives data from any of the traversal s-machines 410, it processes the data according to its type, and passes this information onto the appropriate template s-machines 415, which then generate task s-machines 230 and executable task 220. In the illustrated embodiment, traversal s-machine 410(1) is linked to traversal s-machine 410(2) to signal to traversal s-machine 410(2) when to commence operation after traversal s-machine 410(1) is complete. Similarly, traversal s-machine 410(2) is linked to traversal s-machine 410(3) to signal to traversal s-machine 410(3) when to commence operation after traversal s-machine 410(2) is complete.

Figure 5A:
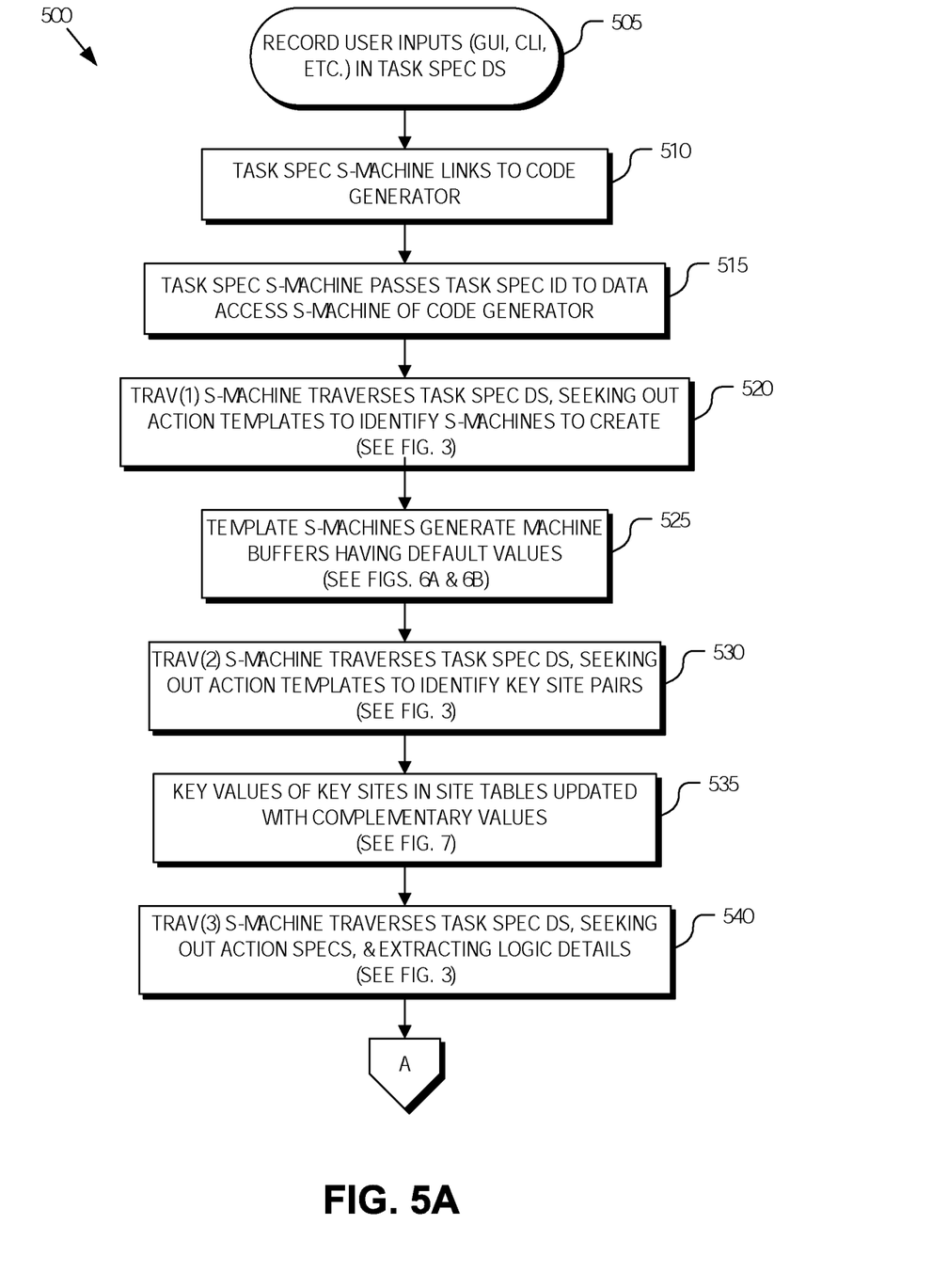
FIG. 5A is a flow chart illustrating a first portion of a process for generating a task using a code generator with reference to a task specification data structure, in accordance with an embodiment of the invention.
Figure 5B:
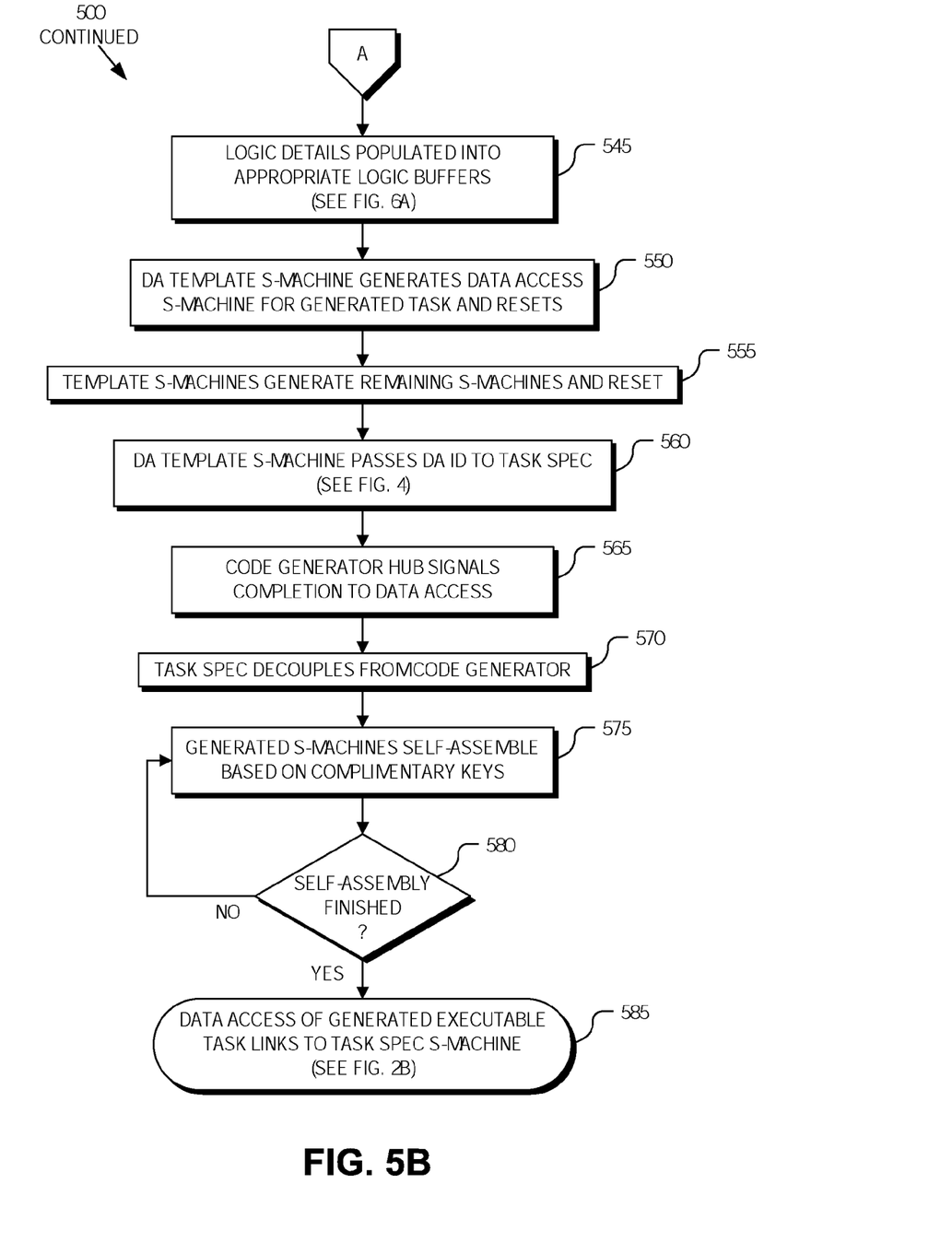
FIG. 5B is a flow chart illustrating a second portion of a process for generating a task using a code generator with reference to a task specification data structure, in accordance with an embodiment of the invention.

FIGS. 5A and 5B include a flow chart illustrating a process 500 for generating executable task 220 using code generator 400 with reference to task spec DS 300, in accordance with an embodiment of the invention. The order in which some or all of the process blocks appear in each process below should not be deemed limiting. Rather, one of ordinary skill in the art having the benefit of the present disclosure will understand that some of the process blocks may be executed in a variety of orders not illustrated. Furthermore, it should be appreciated that process 500 illustrates one possible technique for generating executable task 220 and that one or more modifications to process 500 are possible within the spirit of the instant disclosure.

In a process block 505, user inputs are recorded in task spec DS 210 (e.g., task spec DS 300). As discussed above, task spec DS 300 may be recorded from CLI, GUI, obtained from a library, some combination thereof, or otherwise. In a process block 510, task specification s-machine 305 links to code generator 400. In the illustrated embodiment of code generator 400, task specification s-machine 305 links to code-gen DA s-machine 420. Upon linking to code-gen DA s-machine 420, task specification s-machine 305 reveals one or more new binding sites 105 to pass a task spec identifier ("ID") to code-gen DA s-machine 420. The task spec ID acts as a sort of key or address to enable the sub-components of code generator 400 to access and communicate with task spec DS 300. In particular, code-gen DA s-machine 420 makes the task spec ID available to traversal s-machines 410 so they may access, inspect, and traverse the various branches or hierarchy of task spec DS 300.

In a process block 520, traversal s-machine 410(1) inspects task spec DS 300, seeking out s-machine type data in action template s-machines 320 to identify which s-machines are to be created, as defined by task spec DS 300. Traversal s-machine 410(1) passes the s-machine type data to code generator hub 405. For each piece of s-machine type data received from traversal s-machine 410(1), code generator hub 405 inspects the s-machine type data to learn which type of s-machine is to be generated. It then identifies the particular template s-machine 415 associated with that type and passes that template s-machine 415 a signal to generate a new machine buffer.

In one embodiment, code generator 400 includes a plurality of template s-machines 415 linked to code generator hub 405. Each template s-machine 415 is capable of generating a specific s-machine with default settings/characteristics, which may be modified using the information retrieved from task spec DS 300 by traversal s-machines 410. In the example of generating a calculator task, there may be one template s-machine 415 for generating an s-machine to perform addition, subtraction, multiplication, and division, other template s-machines 415 for generating s-machines to implement other higher level mathematical functions, and yet other template s-machines 415 for generating s-machines to implement GUI functions. Accordingly, code generator 400 may include a full complement of template s-machines 415 coupled to code generator hub 405 for generating a variety of different basic building block s-machines, which can be specifically tailored or modified using information extracted from task spec DS 300.

Figure 6A:
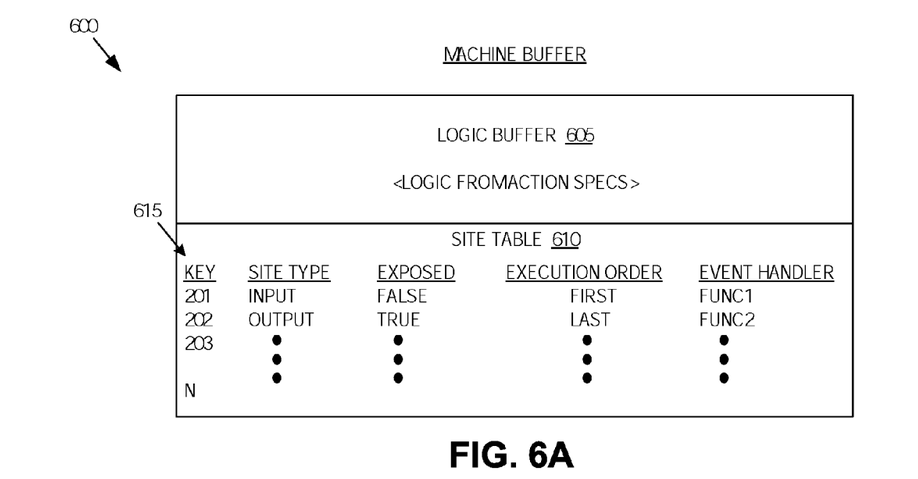
FIG. 6 illustrates an example machine buffer including default key values, in accordance with an embodiment of the invention.
Figure 6B:
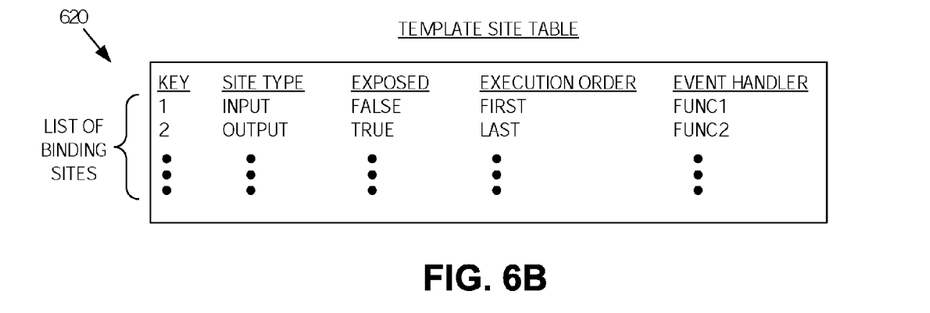

Once specific s-machines have been identified for generation and their corresponding template s-machines 415 notified, the notified template s-machines 415 generate machine buffers having default values for each instance of an s-machine that is to be created (process block 525). FIG. 6 illustrates an example machine buffer 600, in accordance with an embodiment of the invention. The illustrated embodiment of machine buffer 600 includes a logic buffer 605 and a site table 610. Logic buffer 605 is a memory buffer for storing the logic details for a particular instance of an s-machine that is to be created. Similarly, site table 610 identifies the various binding sites 105 that the particular instance of an s-machine will have prior to its generation.

Logic buffer 605 and site table 610 of machine buffer 600 are initially created with default logic and key values, which are subsequently modified based on information extracted from task spec DS 300. Accordingly, each template s-machine 415 is capable of generating a generic s-machine, which can be specifically tailored based on task spec DS 300.

Site table 610 is initially generated by creating an instance of a template site table, which is then populated with default key values 615 for binding sites 105. Site table 610 is generated based on a template site table that defines the default binding sites 105 that the particular s-machine to be generated will include along with attributes associated with each binding site 105. Example attributes that may be identified in connection with each binding site 105 to be created include: key value, site type, whether or not the binding site is exposed or hidden, an execution order of logic associated with the binding site, the particular function to be executed in connection with stimulus received on the binding site. Accordingly, machine buffer 600 is a sort of worksheet created for each instance of an s-machine that is to be created by template s-machines 415, and which is initially populated with default values and subsequently modified based on task spec DS 300.

Returning to FIG. 5A, in a process block 530, traversal s-machine 410(2) inspects task spec DS 300, seeking out action template s-machines 320 to identify key site pair data. The key site pair data extracted from action template s-machines 320 is used to direct the self-assembly of task s-machines 230 and task DA s-machine 235 which establishes links 240 based on appropriately encoded key values associated with each binding site 105. The key site pair data extracted by traversal s-machine 410(2) is provided to the code generator hub 405. The key site pair data indicates that some particular s-machine site (e.g., s-machine A, site B) is to be made complementary to some other particular s-machine site (e.g., s-machine C, site D). For each piece of key site pair data received from traversal s-machine 410(2), code generator hub 405 inspects the key site pair data and identifies the template s-machines associated with s-machines A and C, which we will term template s-machine E and template s-machine F, respectively. Code generator hub 405 obtains from template s-machine E the key assigned to s-machine A, site B, then sends a signal to template s-machine F to assign the complementary key to s-machine C, site D.

Figure 7:
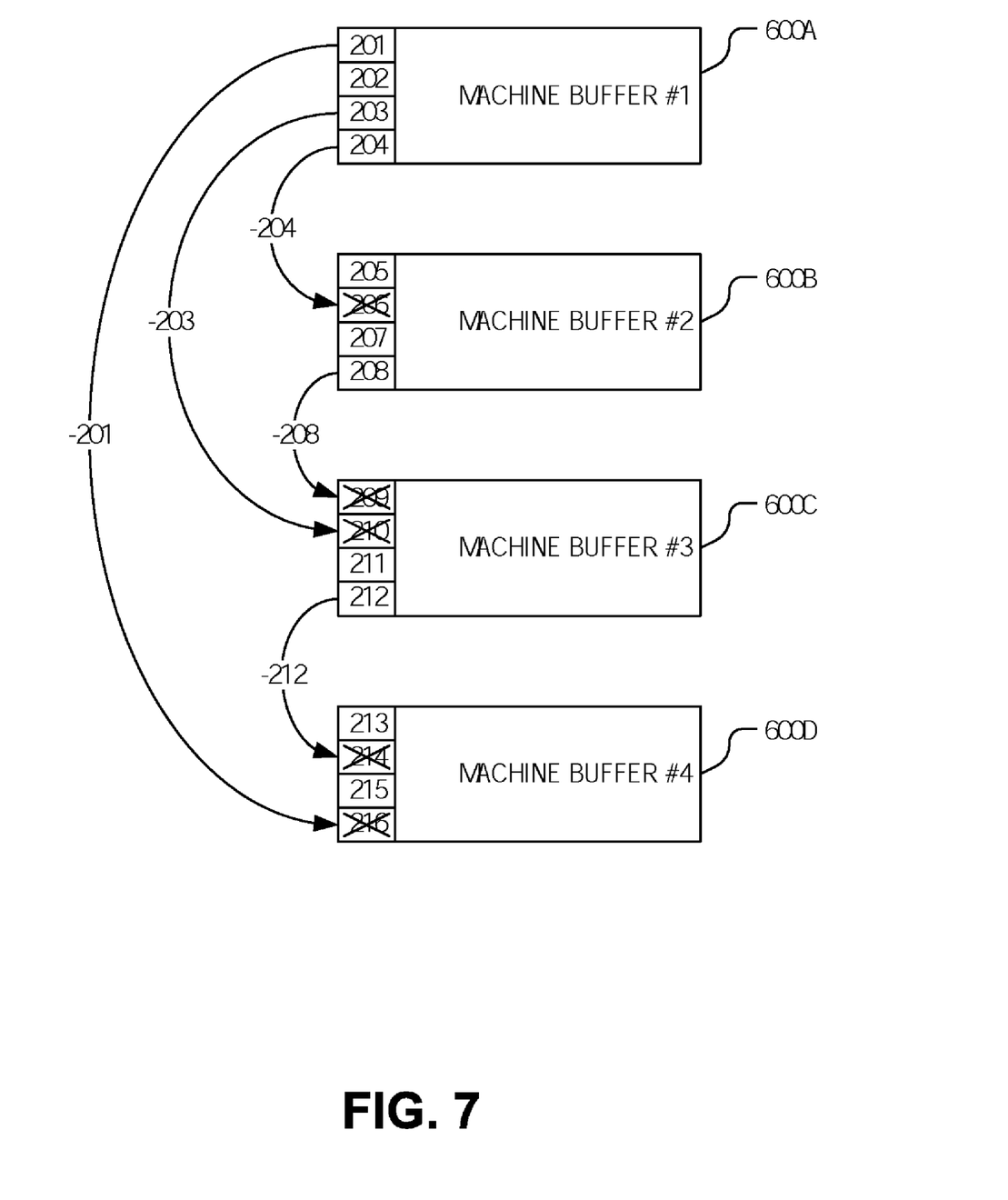
FIG. 7 is a block diagram illustrating how default key values of the machine buffers are updated to facilitate self-assembly after generation, in accordance with an embodiment of the invention.

In a process block 535, template s-machines 415 update default key values 615 associated with each machine buffer 600. FIG. 7 is a block diagram illustrating how default key values 615 are updated, in accordance with an embodiment of the invention. FIG. 7 illustrates four example machine buffers 600A, 600B, 600C, and 600D. In one embodiment, default key values 615 are updated with complementary key pairs such that binding sites 105 encoded with complementary key values will form one of links 240 upon generation of the associated task s-machines 230 or task DA s-machine 235.

Returning to FIG. 5A, in a process block 540, traversal s-machine 410(3) inspects task spec DS 300, seeking out action specification s-machines 315 to find logic details associated with task s-machines 230 and task DA s-machine 235. In process block 545 (see FIG. 5B), the logic details located by traversal s-machine 410(3) are provided to the code generator hub 405. The code generator hub 405 processes the logic data received from traversal s-machine 410(3) into appropriate data structures and functions, and passes them to the appropriate template s-machines 415 to populate into logic buffers 605. The logic details extracted from task spec DS 300 may be added to default logic already present in logic buffers 605 of each machine buffer 600 or replace/modify the default logic.

Once the machine buffers 600 associated with each instance of an s-machine to be generated have been updated and/or modified, the s-machines are ready to be generated. Code generator hub 405 sends a generate signal to each of the template s-machines 415. As mentioned above, the updated/modified machine buffers 600 function as a sort of worksheet from which the associated template s-machine 415 will generate its s-machine (e.g., one of task s-machines 230 or task DA s-machine 235).

In a process block 550, DA template s-machine 415(1) generates task DA s-machine 235 based on its corresponding machine buffer 600 and assigns a DA ID to the newly generated task DA s-machine 235. In a process block 555, each of the template s-machine 415(2) to 415(N) that have populated machine buffers 600 (i.e., that have one or more machines to generate) generate the remaining task s-machines 230 based on their corresponding machine buffers 600. After generating their s-machines, each template s-machine 415 deletes all machine buffers it used to generate s-machines. In this way, the template s-machines are reset to their initial state, ready for the next code generation process 500. In a process block 560, DA template s-machine 415(1) pass the DA ID to task specification s-machine 305. The DA ID is provided to task specification s-machine 305 so task specification s-machine 305 can expose a binding site 105 having a key value that will link to task DA s-machine 235 upon generation of task DA s-machine 235.

In a process block 565, code generator hub 405 signals to code-gen DA s-machine 420 that code generation is complete, which results in code-gen DA s-machine 420 and task specification s-machine 305 decoupling (process block 570). In a process block 575, the newly generated s-machines (e.g., task s-machines 230 and task DA s-machine 235) self-assemble forming links 240 between their bonding sites 105 based on the key values encoded in process block 535. Upon completion of the self-assembly (decision block 580), the newly generated task DA s-machine 235 links to task specification s-machine 305 of task spec DS 300 (or task spec DS 210) (process block 585). Task DA s-machine 235 links to task specification s-machine 305 in preparation of execution of the newly generated executable task 220.

Figure 8:
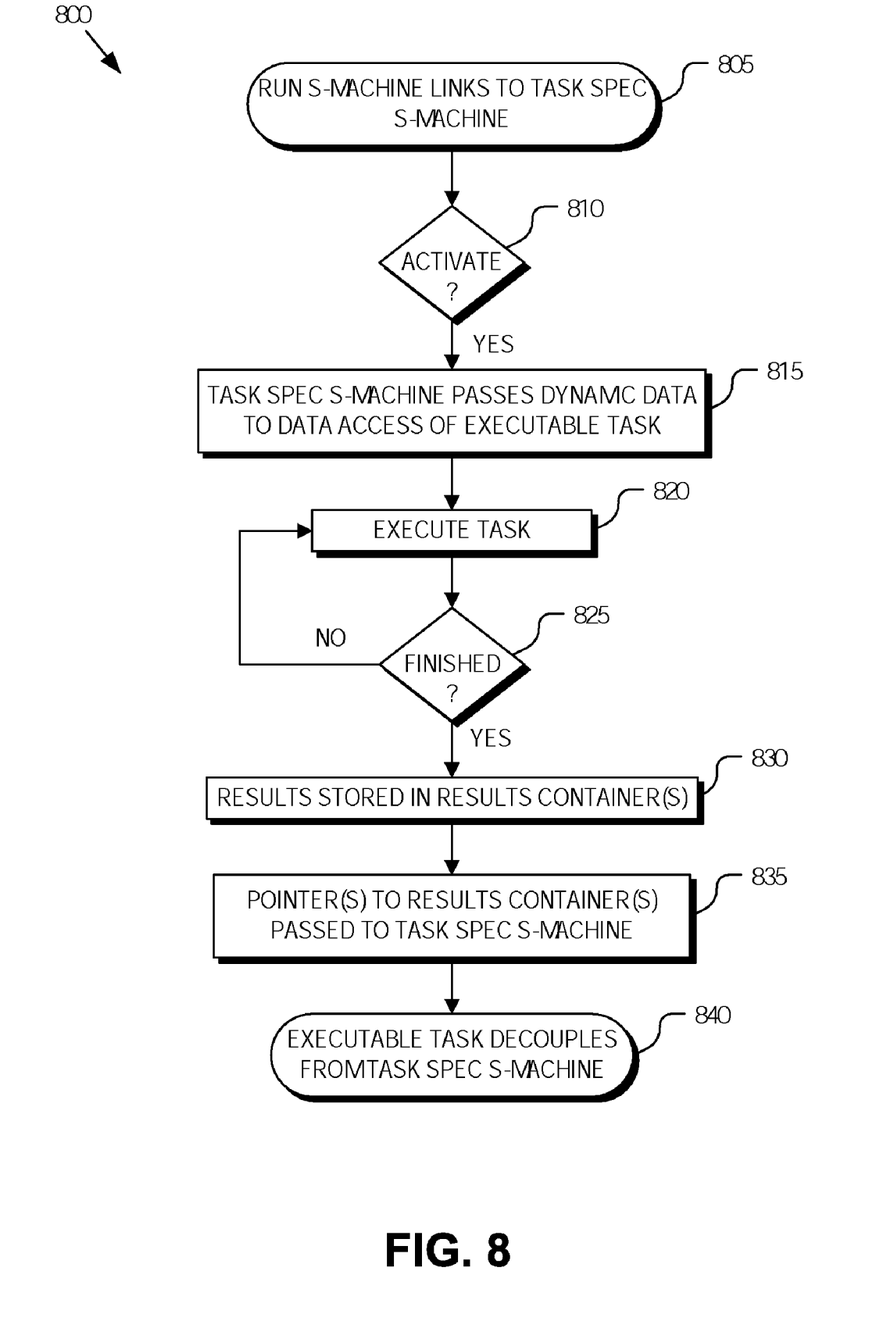
FIG. 8 is a flow chart illustrating a process for executing a generated task, in accordance with an embodiment of the invention.

FIG. 8 is a flow chart illustrating a process 800 for executing executable task 220, in accordance with an embodiment of the invention. In a process block 805, run s-machine 250 links to task specification s-machine 305. Upon receipt of an activation trigger from run s-machine 250 (decision block 810), task specification s-machine 305 retrieves the dynamic data, passes it to task DA s-machine 235 of executable task 220, and signals executable task 220 to execute (process block 815). Executable task 220 executes (process block 820)

to completion (decision block 825). Upon completion, the results of the execution by executable task 220 are stored in one or more results containers 260 (process block 830) and a pointer or link to results container(s) 260 is output to task spec DS 300 for storing in task specification s-machine 305 (process block 835). In a process block 840, task spec DS 300 may decouple from executable task 220 to allow other task spec DS's to link thereto and execute executable task 220 with different input data.

Figure 9:
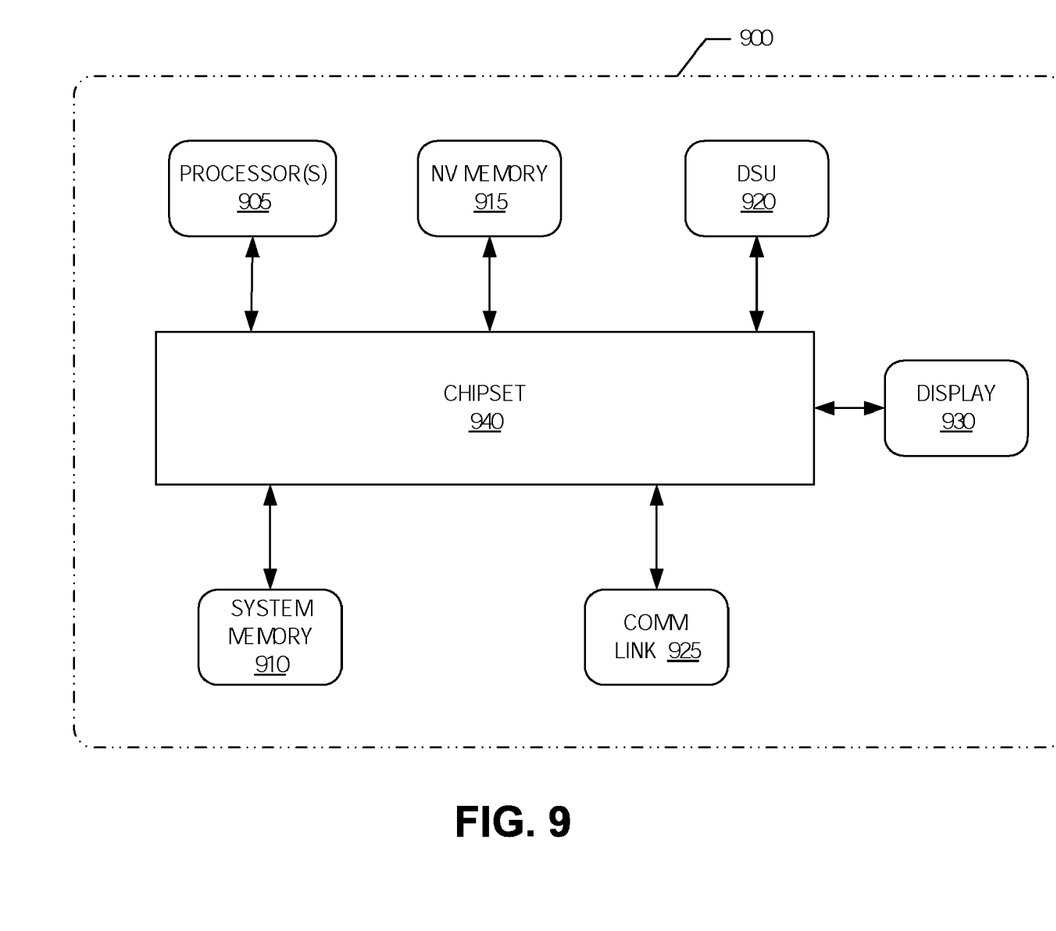
FIG. 9 is a block diagram illustrating a demonstrative processing system to execute embodiments of the invention thereon.

FIG. 9 is a block diagram illustrating a demonstrative processing system 900 for executing embodiments of the invention described above. The illustrated embodiment of processing system 900 includes one or more processors (or central processing units) 905, system memory 910, nonvolatile ("NV") memory 915, a data storage unit ("DSU") 920, a communication link 925, a display 930, and a chipset 940. The illustrated processing system 900 may represent any computing system including a desktop computer, a notebook computer, a workstation, a handheld computer, a server, a blade, or the like.

The elements of processing system 900 are interconnected as follows. Processor(s) 905 is communicatively coupled to system memory 910, NV memory 915, DSU 920, and communication link 925, via chipset 940 to send and to receive instructions or data thereto/therefrom. In one embodiment, NV memory 915 is a flash memory device. In other embodiments, NV memory 915 includes any one of read only memory ("ROM"), programmable ROM, erasable programmable ROM, electrically erasable programmable ROM, or the like. In one embodiment, system memory 1410 includes random access memory ("RAM"), such as dynamic RAM ("DRAM"), synchronous DRAM ("SDRAM"), double data rate SDRAM ("DDR SDRAM"), static RAM ("SRAM"), or the like. DSU 920 represents any storage device for software data, applications, and/or operating systems, but will most typically be a nonvolatile storage device. DSU 920 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 920 is illustrated as internal to processing system 900, DSU 920 may be externally coupled to processing system 900. Communication link 925 may couple processing system 900 to a network such that processing system 900 may communicate over the network with one or more other computers. Communication link 925 may include a modem, an Ethernet card, a Gigabit Ethernet card, Universal Serial Bus ("USB") port, a wireless network interface card, a fiber optic interface, or the like. Display unit 930 may be coupled to chipset 940 via a graphics card and renders images for viewing by a user.

It should be appreciated that various other elements of processing system 900 may have been excluded from FIG. 9 and this discussion for the purposes of clarity. Chipset 940 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 940. Correspondingly, processing system 900 may operate without one or more of the elements illustrated. For example, processing system 900 need not include DSU 920.

The processes explained above are described in terms of computer software and hardware. The techniques described may constitute computer-executable instructions embodied within a computer readable medium, that when executed by a computer will cause the computer to perform the operations described. Additionally, the processes may be embodied within hardware, such as an application specific integrated circuit ("ASIC") or the like.

A computer-accessible medium includes any mechanism that provides (i.e., stores and/or transmits) information in a form accessible by a physical machine (e.g., a computer, network device, personal digital assistant, manufacturing tool, any device with a set of one or more processors, etc.). For example, a computer-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.
are entities to create the executable task.

What is claimed is:

1. A method to generate an executable task, comprising:
   inspecting a task specification data structure to determine what software entities will form the executable task;
   inspecting the task specification data structure to determine how the software entities will be linked after generating the software entities;
   inspecting the task specification data structure to determine logic to be executed by the software entities;
   generating the software entities, wherein the software entities are executable components that self-organize after generation and during runtime operation of the software entities combine with one another for forming the executable task;
   decoupling the task specification data structure from a code generator;
   after the decoupling, linking at least a portion of the task specification data structure to the executable task; and
   executing the executable task.

2. The method of claim 1, further comprising linking the task specification data structure to the code generator, wherein inspecting the task specification data structure and generating the software entities are executed by the code generator.

3. The method of claim 2, wherein the code generator comprises:
   one or more traversal software-machines ("s-machines") to inspect the task specification data structure to determine what software entities will form the executable task, to inspect the task specification data structure to determine how the software entities will be linked after generating the software entities, and to inspect the task specification data structure to determine logic to be included with each of the software entities;
   at least one template s-machine to generate the software entities; and
   a code generator hub to interlink the one or more traversal s-machines with the at least one template s-machine.

4. The method of claim 1, wherein generating the software entities comprises:
- generating a logic buffer for each of the software entities, the logic buffer comprising logic determined based on the task specification data structure; and
- generating a site table for each of the software entities, the site table comprising a list of binding sites for linking to other ones of the software entities.

5. The method of claim 4, wherein generating the site table for each of the software entities comprises:
- generating the list of binding sites of the site table with default key values; and
- updating the default key values for each site table based on an inspection of the task specification data structure to determine how the software entities will be linked, wherein updating the default key values includes generating key value pairs.

6. The method of claim 5, wherein generating the software entities further comprises:
- generating self-organizing software-machines ("s-machines") for the executable task based on the logic buffer and the site table for each of the software entities.

7. The method of claim 6, wherein the key value pairs comprise complementary key values, and wherein generating the software entities further comprises:
- organizing the s-machines for the executable task based on the complementary key values.

8. The method of claim 1, wherein the task specification data structure comprises:
- a task specification software machine ("s-machine") to store a link to output data generated by the executable task;
- at least one action specification s-machine including logic details for determining logic to be included within each of the software entities; and
- at least one action template s-machine including an identification of what software entities will form at least a portion of the executable task and an identification of how at least a portion of the software entities will be linked after generating the software entities.

9. The method of claim 8, wherein the task specification data structure further comprises:
- at least one hierarchical s-machine including an ordered list of s-machines coupled hierarchically below the hierarchical s-machine.

10. The method of claim 9, further comprising:
- generating a cloning site on one of the hierarchical s-machines in response to linking the one of the hierarchical s-machines to the task specification s-machine;
- linking a second task specification s-machine to the cloning site;
- linking the second task specification s-machine to the executable task;
- re-executing the executable task with new inputs provided by the second task specification s-machine; and
- storing a second link to new results in the second task specification s-machine.

11. A system, comprising:
- a processor to execute instructions; and
- a data storage unit coupled to the processor, the data storage unit storing the instructions that, if executed by the processor, will cause the processor to perform operations including:
  - inspecting a task specification data structure to determine what software entities are to be generated to create an executable task specified by the task specification data structure;
  - inspecting the task specification data structure to determine how the software entities will be linked after generating the software entities;
  - generating the software entities, wherein the software entities are executable components that self-organize after generation and during runtime operation of the software entities combine with one another for forming the executable task;
  - decoupling the task specification data structure from a code generator;
  - after the decoupling, linking the task specification data structure to the executable task; and
  - executing the executable task.

12. The system of claim 11, wherein the data storage unit further stores instructions that, if executed by the processor, will cause the processor to perform further operations, comprising:
- linking the task specification data structure to the code generator, wherein inspecting the task specification data structure and generating the software entities are executed by the code generator.

13. The system of claim 12, wherein the code generator includes:
- one or more traversal software-machines ("s-machines") to inspect the task specification data structure to determine what software entities will form the executable task, to inspect the task specification data structure to determine how the software entities will be linked after generating the software entities, and to inspect the task specification data structure to determine logic to be included with each of the software entities;
- at least one template s-machine to generate the software entities; and
- a code generator hub to interlink the one or more traversal s-machines with the at least one template s-machine.

14. The system of claim 11, wherein generating the software entities comprises:
- generating a logic buffer for each of the software entities, the logic buffer comprising logic determined based on the task specification data structure; and
- generating a site table for each of the software entities, the site table comprising a list of binding sites for linking to other ones of the software entities.

15. The system of claim 14, wherein generating the site table for each of the software entities, comprises:
- generating the list of binding sites of the site table with default key values; and
- updating the default key values for each site table based on an inspection of the task specification data structure to determine how the software entities will be linked, wherein updating the default key values comprises generating key value pairs.

16. The system of claim 15, wherein the key value pairs comprise complementary key values, and wherein generating the software entities further comprises organizing the software entities of the executable task based on the complementary key values.

17. The system of claim 16, wherein the data storage unit further stores instructions that, if executed by the processor, will cause the processor to perform further operations, comprising:
- storing results of the executable task in a results container; and
- storing a pointer to the results container in the task specification data structure.

18. A machine-readable storage medium having stored thereon instructions that, if executed by a machine, will cause the machine to perform operations comprising:
    linking a task specification data structure to a code generator;
    inspecting the task specification data structure to determine functionality to be implemented by an executable task defined by the task specification data structure;
    generating software entities based on the inspection of the task specification data structure, wherein the software entities are executable components that self-organize after generation and during runtime operation of the software entities combine with one another for forming the executable task;
    decoupling the task specification data structure from the code generator;
    after the decoupling, linking the task specification data structure to the executable task; and
    executing the executable task.

19. The machine-readable storage medium of claim 18, further comprising:
    assigning key values to the software entities; and
    linking the software entities together based on the key values to self-organize the software entities into the executable task.

20. The machine-readable storage medium of claim 19, wherein the software entities are generated in random access memory of the machine as executables ready for execution by the machine.

21. The machine-readable storage medium of claim 18, wherein the task specification data structure comprises:
    one or more action specifications defining a logic functionality to be implemented by the executable task; and
    one or more action templates describing particular ones of the software entities that implement the logic functionality defined in the one or more action specifications.

22. The machine-readable storage medium of claim 21, wherein the task specification data structure comprises a hierarchical data structure, the task specification data structure further comprising one or more hierarchical software entities to hierarchically organize the one or more action specifications and the one or more action templates.

23. The machine-readable storage medium of claim 18, wherein generating the software entities based on the inspection of the task specification data structure comprises:
    generating logic buffers for the software entities, the logic buffers comprising logic determined based on the task specification data structure; and
    generating site tables for the software entities, the site tables each comprising a list of binding sites for linking the software entities.

24. The machine-readable storage medium of claim 23, wherein the code generator includes a plurality of template software-machines ("s-machines") to generate the logic buffers and the site tables, wherein generating the site tables for the software entities comprises:
    generating the site tables for each of the software entities with default key values assigned to each binding site within the list of binding sites; and
    updating the default key values based on information extracted from the task specification data structure.

25. The machine-readable storage medium of claim 23, wherein generating the software entities based on the inspection of the task specification data structure comprises:
    traversing the task specification data structure to determine what software entities will form the executable task by inspecting the one or more action templates;
    traversing the task specification data structure to determine how the software entities will be linked after generating the software entities by inspecting the one or more action templates; and
    traversing the task specification data structure to determine a logic functionality to be implemented by the executable task by inspecting the one or more action specifications.

26. The machine-readable storage medium of claim 18, further providing instructions that, if executed by the machine, will cause the machine to perform further operations, comprising:
    storing results of the executable task; and
    storing a pointer to the results in the task specification data structure.

27. The method of claim 18, further comprising:
    storing results of the executable task; and
    storing a pointer to the results in the portion of the task specification data structure.

\* \* \* \* \*